UNITED STATES PATENT OFFICE.

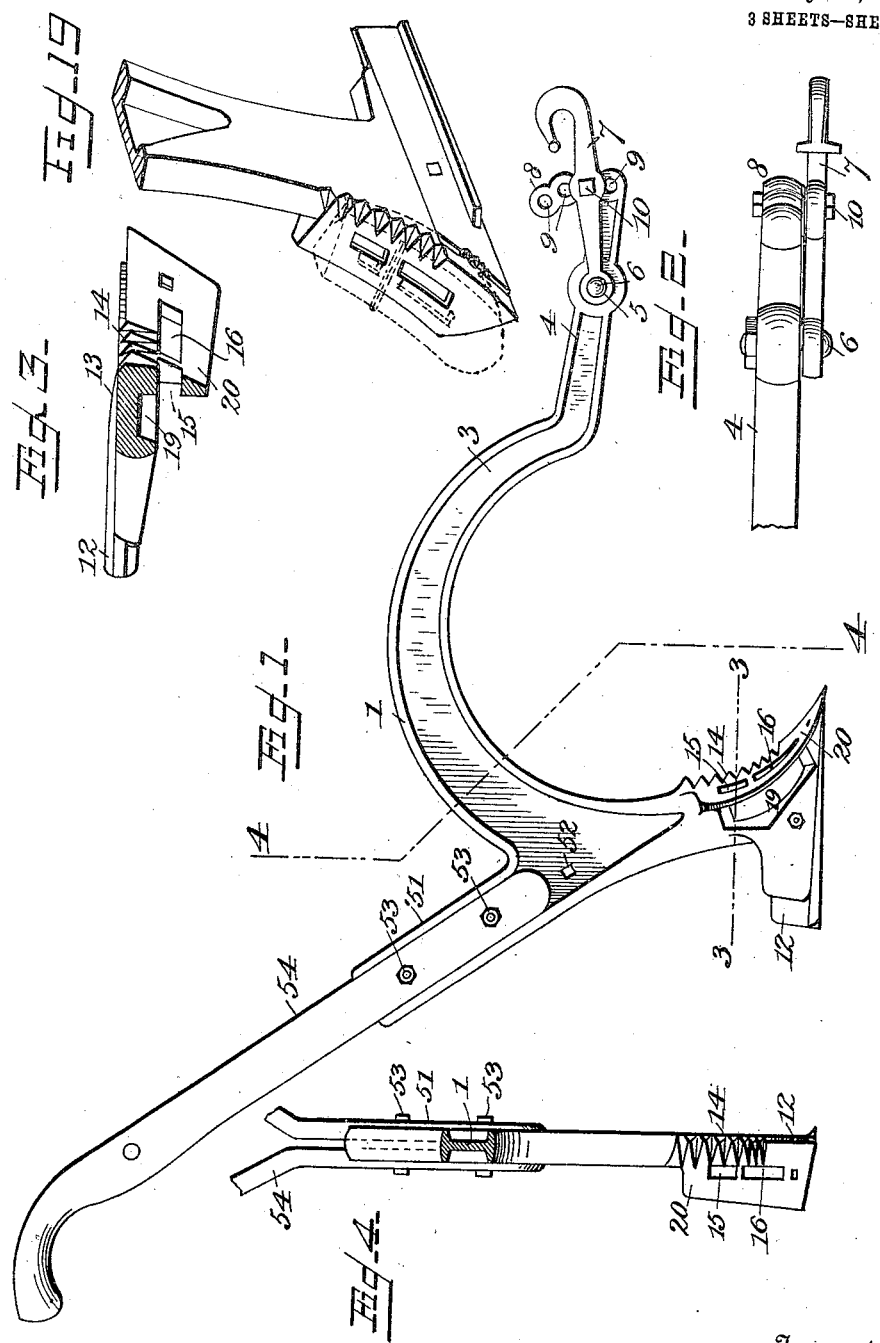

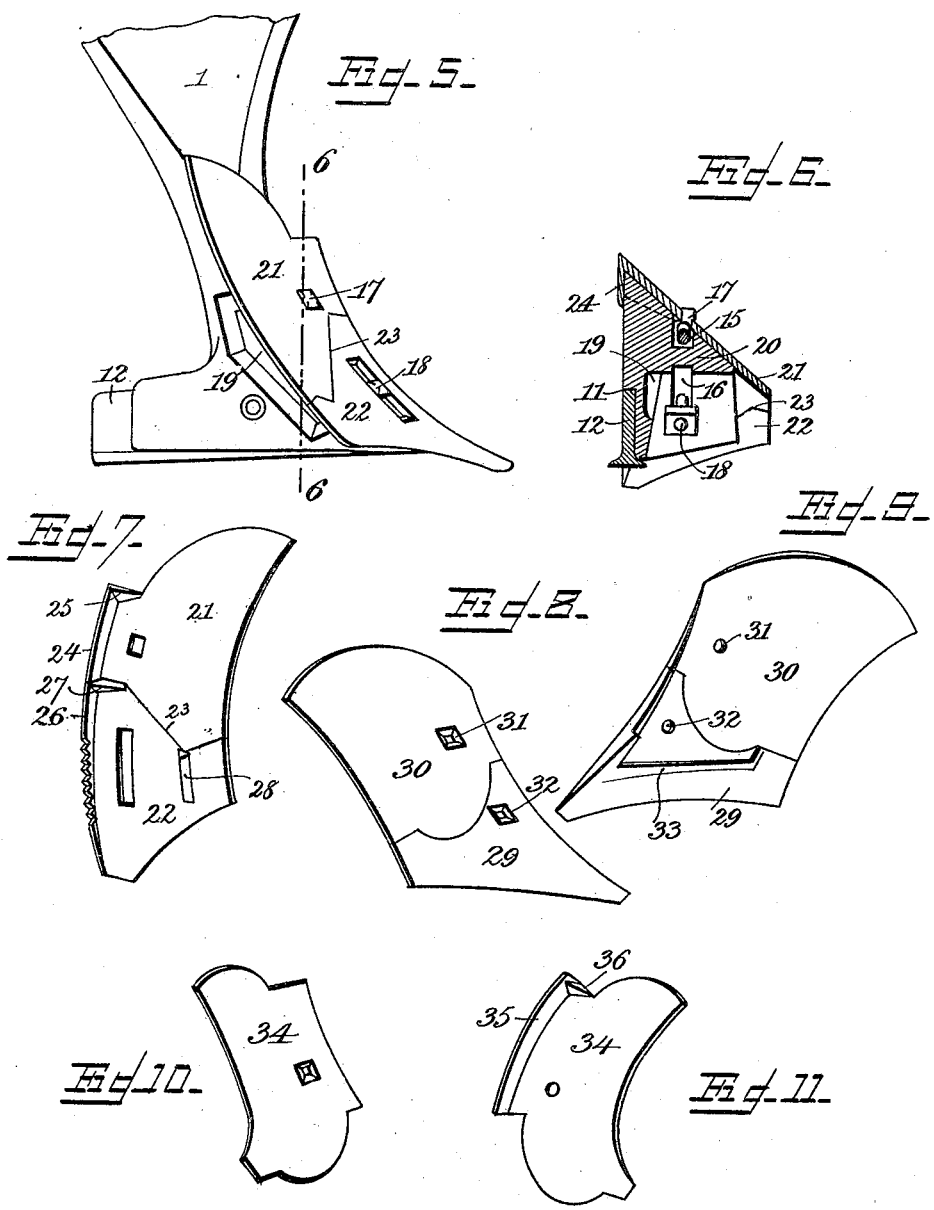

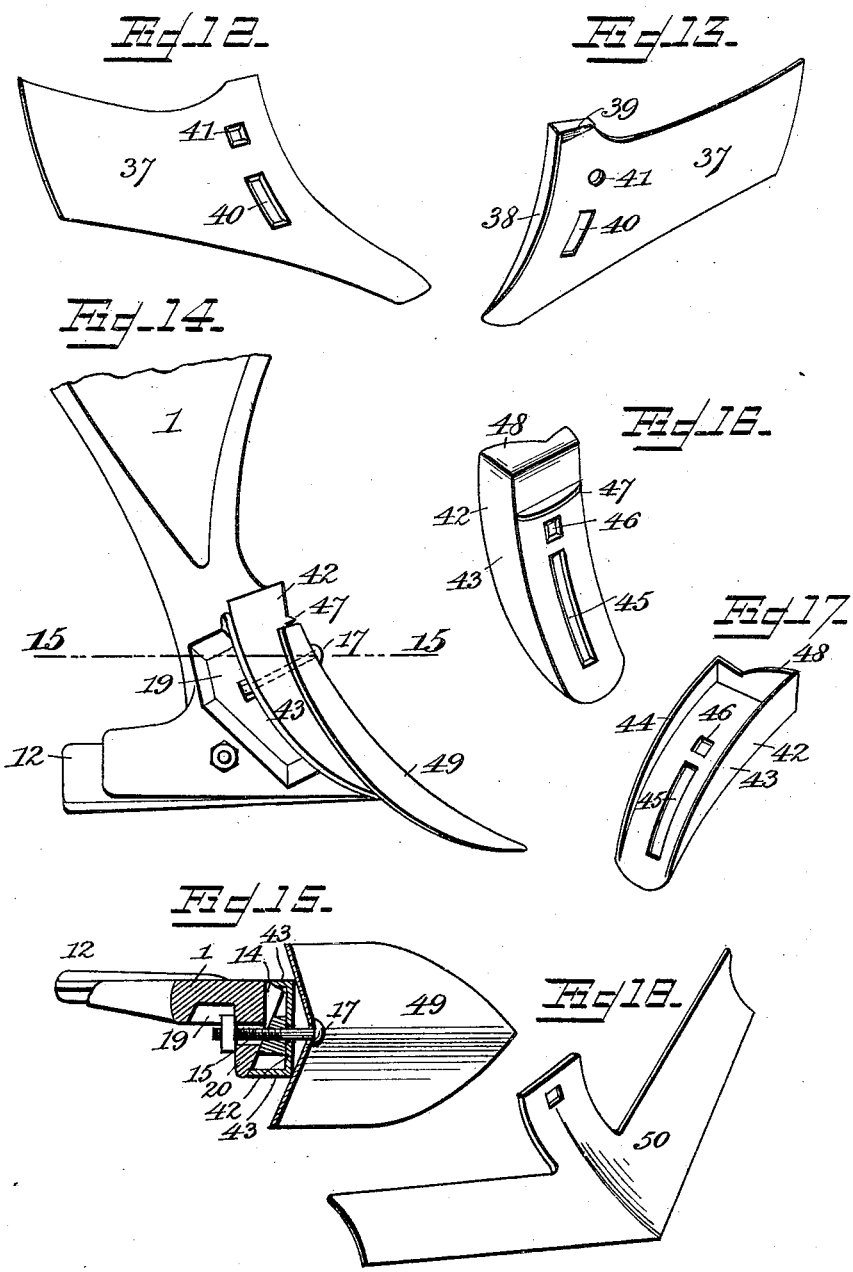

ROBERT T. HUGGINS, OF VENTERS, SOUTH CAROLINA, ASSIGNOR OF ONE-HALF TO J. ALLEN HUGGINS, OF RED SPRINGS, NORTH CAROLINA.

PLOW.

No. 922,905.　　　　　Specification of Letters Patent.　　　　Patented May 25, 1909.

Application filed June 8, 1908.　Serial No. 437,405.

*To all whom it may concern:*

Be it known that I, ROBERT T. HUGGINS, a citizen of the United States, residing at Venters, in the county of Williamsburg and State of South Carolina, have invented certain new and useful Improvements in Plows; and I do declare the following to be a full, clear, and exact description of the invention, such as will enable others skilled in the art to which it appertains to make and use the same.

My invention relates to agricultural implements, and particularly to combined cultivators and plows.

The object of the invention is to provide an implement of this character which may be instantly transformed from a turn plow to a cultivator, or middle-buster, as the case may warrant.

A further object of the invention is the provision of means employed for straightening up the point receiving foot so that cultivators, sweeps, and middle-buster points may be rightly positioned upon the inclined foot of the plow.

A further object of the invention is the provision of the clevis attachment which is vertically adjustable upon either side of the plow beam so that the proper adjustment may be obtained whether the draft animal is traveling in the row or on either side of the row.

A still further object of the invention is the provision of means for adjusting the handles of the invention whereby it may be adapted for operators of different stature.

With these and other objects in view, the invention consists of certain novel features of construction, combination and arrangement of parts, as will be more fully described and particularly pointed out in the appended claims.

In the drawings, Figure 1 is a side elevation of the device, Fig. 2 is a fragmentary top plan view of the draft end of the beam, Fig. 3 is a horizontal section taken on the line 3—3 of Fig. 1, Fig. 4 is a vertical section taken on the line 4—4 of Fig. 1, Fig. 5 is a detail side elevation of the plow with an adjustable share and mold-board attached thereto, and with parts broken away, Fig. 6 is a vertical sectional view taken on the line 6—6 of Fig. 5, Fig. 7 is a rear perspective view of the share and point shown in Figs. 5 and 6, Fig. 8 is a front perspective view of the dixie point, Fig. 9 is a rear perspective view of these parts, Fig. 10 is a detail perspective view of a sub-soil wing to be used in connection with the dixie point shown in Figs. 8 and 9, Fig. 11 is a rear perspective view, Fig. 12 is a front perspective view of a half sweep cultivator point, Fig. 13 is a rear perspective view of the point shown in Fig. 12, Fig. 14 is a side elevation of the plow beam with the adjusting plate, for sweep and shovel points, and showing a middle-buster point attached thereto, Fig. 15 is a horizontal section on the line 15—15 of Fig. 14, Fig. 16 is a detail perspective view of the adjusting plate, Fig. 17 is a rear prespective view thereof, and Fig. 18 is a perspective view of the cultivator sweep used in connection with the adjusting plate. Fig. 19 is a detailed perspective view of the foot of the plow, showing the attachment applied thereto in dotted lines.

Referring more especially to the drawings, 1 represents the beam which is provided with the downwardly extending foot portion 3, and a forwardly extending horizontal draft portion 4, which is notched near its end and provided with an aperture 5, to receive the clevis bolt 6, to which the clevis 7 is attached. Forward of the bolt 6 I provide an arc-shaped adjusting arm 8, which is provided with a plurality of apertures 9, adapted to receive a bolt 10, which passes through the clevis so as to secure it in any adjusted position. The lower end of the foot is recessed as at 11, to receive the foot piece 12, which extends rearwardly from the front part of the foot piece and forms a bearing upon which the plow may run. The front portion of the foot piece is beveled off as at 13, so as to properly receive the turn plow shares shown in Figs. 5, 6, 7, 8, 9, 10, 11, 12 and 13. On this forward side I notch the foot piece as at 14, so as to receive suitable lugs carried on the rear of the plow-share so that they may be adjusted down or up the foot, as occasion may require. In order to attach these points and shares to the plow foot I form slots or apertures in each one, as will hereinafter be described, and make slots 15 and 16, within the foot to receive the attaching bolts 17 and 18, which are adapted to pass therethrough and have their nuts seated within the recessed portion 19, formed in the foot behind the beveled flange 20.

In Figs. 5, 6 and 7, I have shown turn-share points 21 and 22, respectively which are inter-engaged with each other, as shown by a peculiar locking point 23, formed upon the upper plate or share 21. The back of the plate 21 is provided with a flange 24, which over-hangs the notched portion 14 and with a lug 25, transverse to the flange which engages one of the notches 14. The point 22 is provided with a corresponding flange 26, and a lug 27. This plate is also provided with a longitudinal rib 28, which over-hangs the extreme edge of the flange 20 In Fig. 7 it will be noticed that the rib or frame 26 is notched to form projections which engage notches formed upon the front or forward end of the foot piece 12. This also assists in holding the plow-share in position upon the foot.

In Figs. 8 and 9 I have shown a dixie-point and wing in perspective views, detached from the plow point, and which are numbered 29 and 30, respectively. These members are held in proper relation upon the foot by bolts which pass through the apertures 31 and 32, and the point is held in position upon the foot by a V-shaped rib 33, which engages the end of the foot and holds it in position. When the device is used as a sub-soiler the wing 30 is dispensed with and a sub-soil wing 34, is provided so that the soil underneath may be properly worked while the soil above is practically undisturbed. This wing is a separate and distinct feature which is provided with a flange 35, and a lug 36, adapted to engage the notched portion 14. Another form which is adapted to be applied to the bar is a half sweep cultivator point which is shown in Figs. 12 and 13. This point 37, is provided with the usual flange 38, adjoining the lug 39, at its upper point, and is furnished with slots 40, and an aperture 41, which are adapted to receive the bolts so as to attach the device to the foot piece.

All of the foregoing points are used in connection with turn-plows, the foot being made slanting, as described, so as to accommodate this type of point and share. In order to utilize the beam for straight work, such as is required with the use of middle-buster points and sweep cultivator points it is necessary that some device be applied to the foot to straighten it up. I, therefore, provide a foot plate 42, having a wide curved flange 43, upon one side, and a small curved flange 44, upon its opposite side. Intermediate the flanges I provide a slot 45, and an aperture 46, which are adapted to receive the attaching bolts so as to adjust the device and the points upon the foot piece. Above the apertures I form integral with the foot a ridge 47, adapted to limit the upward movement of the point, and upon the back I form a locking ridge or lug 48, adapted to engage the notches 14.

In Figs. 14 and 15, I have shown a middle-buster point 49, and in Fig. 18 I have shown a sweep cultivator point 50, both of which are adapted to be applied to the adjustable foot plate 42. In order that the plow may be adapted for operators of different stature I provide a handle receiving member 51, with a plurality of apertures 52, which are adapted to receive the bolts 53, passing through the handle 54, and the handle part of the beam.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claims.

Having thus described my invention what I claim and desire to secure by Letters Patent is:

1. A plow having a foot piece comprising an outstanding curved flange having a diagonal front face and a straight rear face a landside member secured to the side of the foot piece, and adjusting ridges formed on said foot piece adjacent the flange on said member, adapted to engage plow points to hold them in position.

2. In a plow, the combination of a beam having an integral foot piece adapted for use in connection with the turning points, an attachment for said foot piece adapting the plow for use with straight plow points and a point limiting member on the attachment.

3. In a plow, the combination of a beam having an integral foot piece adapted for turning points and shares, an adjustable foot attachment adapted to form a straight support on the foot piece whereby cultivator points may be used and a point limiting member on the attachment.

4. In a plow, the combination with a foot piece, of a slanting flange carried by said foot piece, said foot piece having notches formed therein, an adjusting device adapted to be secured to the foot piece to form a straight support thereon, means for holding the device in adjusted position and a plow point limiting ridge on the attachment.

5. In a plow, the combination with a foot piece, of a slanting flange carried by said foot piece, said foot piece having notches formed therein, an adjusting device adapted to be secured to the foot piece to form a straight support thereon, a transverse lug on the device adapted to engage the notches adapted to hold it in adjusted position, and point limiting means carried by said device.

6. The combination of a plow beam and an angular attachment adjustably mounted thereon and having a ridge on its front face adapted to hold the plow-share.

7. A plow beam, an angular foot piece, a flanged plate adapted to be secured to the foot piece, said flange plate and foot piece having adjusting slots, and means passing through the slots of both to secure the flange plate to the foot piece.

8. A plow comprising a foot piece having notches formed therein, a flange plate adjustably secured to the foot piece, a land side member having notches therein and projections on the under side of the flange plate adapted to engage the notches on the foot piece a landside piece.

9. The combination with a plow beam having an angular foot with notches therein, of a side extension secured to said foot and having notches therein forming a continuation of the notches on the foot, and attachments adapted to be secured to said foot and having flanges to overhang the foot and adjustably engage the foot extension.

10. The combination of a plow beam, an angular foot piece thereon, and a plow point adapted to be adjustably secured to said foot piece, said plow points having ribs thereon to overhang the side of the foot piece and prevent lateral movement upon the foot piece.

11. A plow point comprising a foot piece, a flange plate adjustably secured to the foot piece and having a plurality of slots to correspond with similar slots in the foot piece, adjusting flanges on said plate, and a rib for adjustably engaging the foot piece said rib overhanging the side of the foot piece.

In testimony whereof I have hereunto set my hand in presence of two subscribing witnesses.

ROBERT T. HUGGINS.

Witnesses:
  J. M. G. EADDY,
  J. E. HENINGWY.